United States Patent [19]
Amrany et al.

[11] Patent Number: 5,371,762
[45] Date of Patent: Dec. 6, 1994

[54] TECHNIQUE UTILIZING SIGNAL STORING DEVICES FOR CANCELLING SIGNAL DISPERSION

[75] Inventors: Daniel Amrany, Wayside; Jin-Der Wang, Ocean, both of N.J.

[73] Assignee: AT&T Corp., Murray Hill, N.J.

[21] Appl. No.: 877,926

[22] Filed: May 4, 1992

[51] Int. Cl.[5] .............................................. H04B 1/10
[52] U.S. Cl. .................................. 375/103; 375/102; 348/614
[58] Field of Search .................... 375/103, 99, 102, 58; 364/724.13, 724.01; 358/36, 37; 455/307, 296; 328/165

[56] References Cited

U.S. PATENT DOCUMENTS

| | | | |
|---|---|---|---|
| 4,807,033 | 2/1989 | Keesen et al. | 358/36 |
| 4,933,891 | 6/1990 | Schenk | 364/724.13 |
| 4,953,184 | 8/1990 | Simone | 364/724.1 |
| 5,051,981 | 9/1991 | Kline | 364/724.1 |

FOREIGN PATENT DOCUMENTS

| | | | |
|---|---|---|---|
| 61-192175 | 7/1986 | Japan | H04N 5/21 |
| 63-086970 | 4/1988 | Japan | H04N 5/21 |
| 63-248217 | 10/1988 | Japan | H03H 7/06 |
| 0308776A2 | 3/1989 | Japan | H04N 7/00 |
| 4134975 | 5/1992 | Japan | H04N 5/21 |

OTHER PUBLICATIONS

S. Matsuura et al., "Development of a Ghost Cancel Technology for TV Broadcasting", 1990 NAB Engineering Conference Proceedings, *Result of Field Tests of a Ghost Canceling System for Television Broadcasting*, Appendix A, National Association of Broadcasters, Washington, D.C., 1990, pp. 229–238.

*Primary Examiner*—Stephen Chin
*Assistant Examiner*—Hai H. Phan
*Attorney, Agent, or Firm*—David R. Padnes

[57] ABSTRACT

A signal dispersion cancellation structure receives incoming signal samples at an incoming rate, stores these samples in a first memory and then writes these samples at a submultiple of the incoming rate into a plurality of second memories. Each second memory is associated with a finite impulse response (FIR) filter and the second memory samples are coupled to the associated FIR filter at the incoming rate. Advantageously, apparatus is also provided which enables any sample in a second memory to be provided to the associated FIR filter and outputted therefrom at a time related to the position of any signal dispersion.

18 Claims, 3 Drawing Sheets

GHOST CANCELLER STRUCTURE
PRIOR ART

FULL SPAN APPROACH
PRIOR ART

SEGMENTED-SPARSE APPROACH
PRIOR ART

TECHNIQUE UTILIZING SIGNAL STORING DEVICES FOR CANCELLING SIGNAL DISPERSION

TECHNICAL FIELD

The present invention relates to a signal dispersion cancellation technique and, more particularly, to a technique which is suitable for cancelling ghosts in a television channel.

BACKGROUND OF THE INVENTION

Signal dispersion, such as echoes, ghosts, multipath and intersymbol interference, is an ever-present reality in communications systems. The severity of this problem varies with the system application and, at times, can render a system completely inoperative. For example, signal ghosts or echoes at levels which are merely objectional to the viewer of a conventional television signal can render a high-definition television (HDTV) signal unintelligible. Accordingly, cancellation or compensation for such dispersion cannot be ignored.

Ghosts in a television channel can be categorized as being either precursor or postcursor. A precursor ghost is one that precedes its associated transmitted signal while a postcursor ghost is one that succeeds its associated transmitted signal. FIG. 1 shows a typical ghost canceller structure 100 which includes a feedforward finite impulse response (FIR) filter 101 and an infinite impulse response (IIR) filter 102 in cascade. FIR filter 102 includes a feedback FIR filter 103 and combiner 104, the latter subtracting the output of feedback FIR filter 103 from the output of feedforward FIR filter 101. The feedforward FIR filter equalizes the main signal and any precursor ghosts while the IIR filter, also known as the feedback section, compensates for the one of more postcursor ghosts. The dispersion of the signal defines the required length or span of the feedback FIR filter and is the most difficult part of the ghost canceller structure to implement. While the exact position of any ghosts relative to an associated signal can vary from one application to the next, ghosts in a television channel are generally widely separated from one another and extend over a large time span. For example, the time interval between the furthest precursor and postcursor ghosts associated with the same transmitted signal can be 40 μg seconds.

One prior art technique for implementing the feedback FIR filter in IIR filter 102, referred to as the full-span approach, is shown in FIG. 2. This approach involves implementing the feedback FIR filter using a data memory 201 and tap-weight coefficient store 202. In typical ghost cancellation applications, data memory 201 must have the capacity to store several hundred signal samples, and tap-weight coefficient store 202 must provide one tap-weight coefficient for each stored signal sample. At the incoming signal sample rate, each of the stored signal samples in data memory 201 must be multiplied by its associated tap-weight coefficient in data store 202 via multiplier 203 and the sum of these products coupled to combiner 104. While the full-span structure provides satisfactory ghost cancellation, it is very costly to implement since the incoming signal sample rate is high, e.g., 14.3 MHz, and many high-speed multiplications must be performed at this rate. In addition, the structure is inefficient since most of the tap-weight coefficients have a value of zero due to the wide time separation between ghosts.

FIG. 3 shows another prior art approach, referred to as the segmented-sparse technique, to implement the feedback FIR filter in IIR filter 102. This technique involves the use of variable delay random access memory segments 301-1 through 301-N which are inserted between a plurality of HR filters 302-1 through 302-N. The outputs of such filters are combined by summer 303. While this approach reduces the hardware required compared to the full-span approach, its rigid architectural structure still requires circuit overdesign to meet the required performance goals. For example, if the delay between adjacent ghosts is greater than the maximum delay provided by one memory segment, two or more such memory segments must be concatenated and use of the FIR filter disposed between such segments is lost. Alternatively, when the ghosts are closely-spaced, more than one FIR filter is required between adjacent memory segments and use of a number of memory segments will be lost. As a result, depending on the locations of the ghosts, there is often an underutilization of either FIR filters or memory segments with the segmented-sparse technique.

Accordingly, it would be extremely desirable if a more flexible ghost cancellation structure could be provided which fulfilled both the necessary performance and cost objectives.

SUMMARY OF THE INVENTION

In accordance with the present invention, the limitations of prior art signal dispersion cancellation arrangements are overcome through the use of a structure which receives signal samples having an incoming sample rate, stores these signal samples in a first memory and then writes these samples into at least one second memory. Writing of the samples into each second memory is performed at a submultiple of the incoming sample rate. The samples stored in each second memory are then coupled at the incoming sample rate to an FIR filter associated with each second memory. In the disclosed embodiments which pertain to the cancellation of ghosts associated with television signals, a plurality of second memories is utilized and apparatus is provided which enables any sample in a second memory to be provided to the associated FIR, filtered therein and outputted at a time related to the position of any ghost.

DETAILED DESCRIPTION

Figure 1:
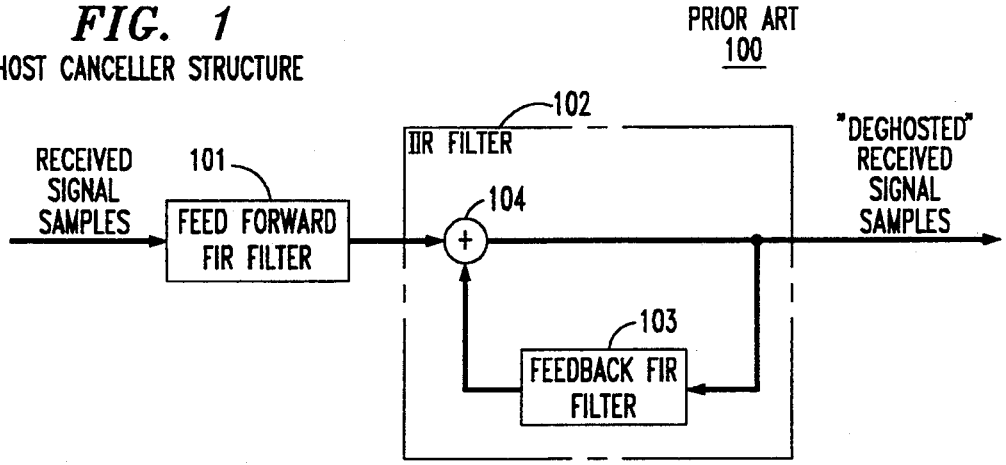
FIG. 1 is a block-schematic diagram of a prior art ghost canceller.
Figure 2:
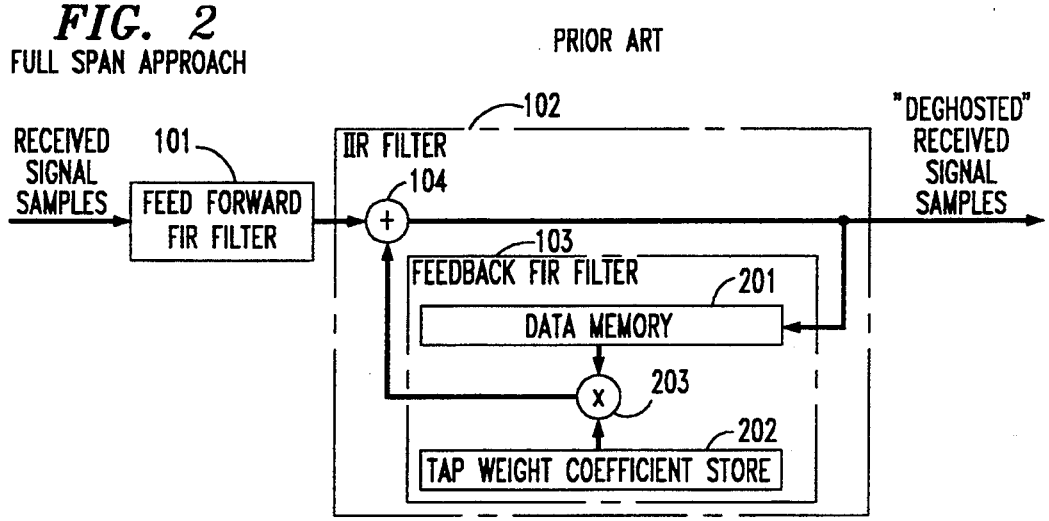
FIG. 2 is a block-schematic diagram of a first prior art approach for realizing the feedback FIR filter shown in FIG. 1.
Figure 3:
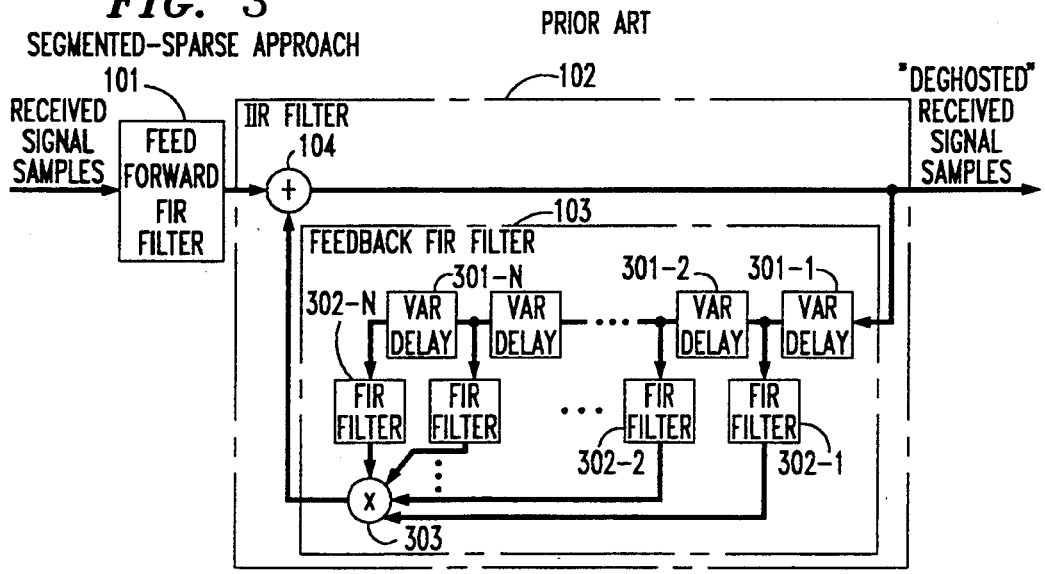
FIG. 3 is a block-schematic diagram of a second prior art approach for realizing the feedback FIR filter shown in FIG. 1.
Figure 4:
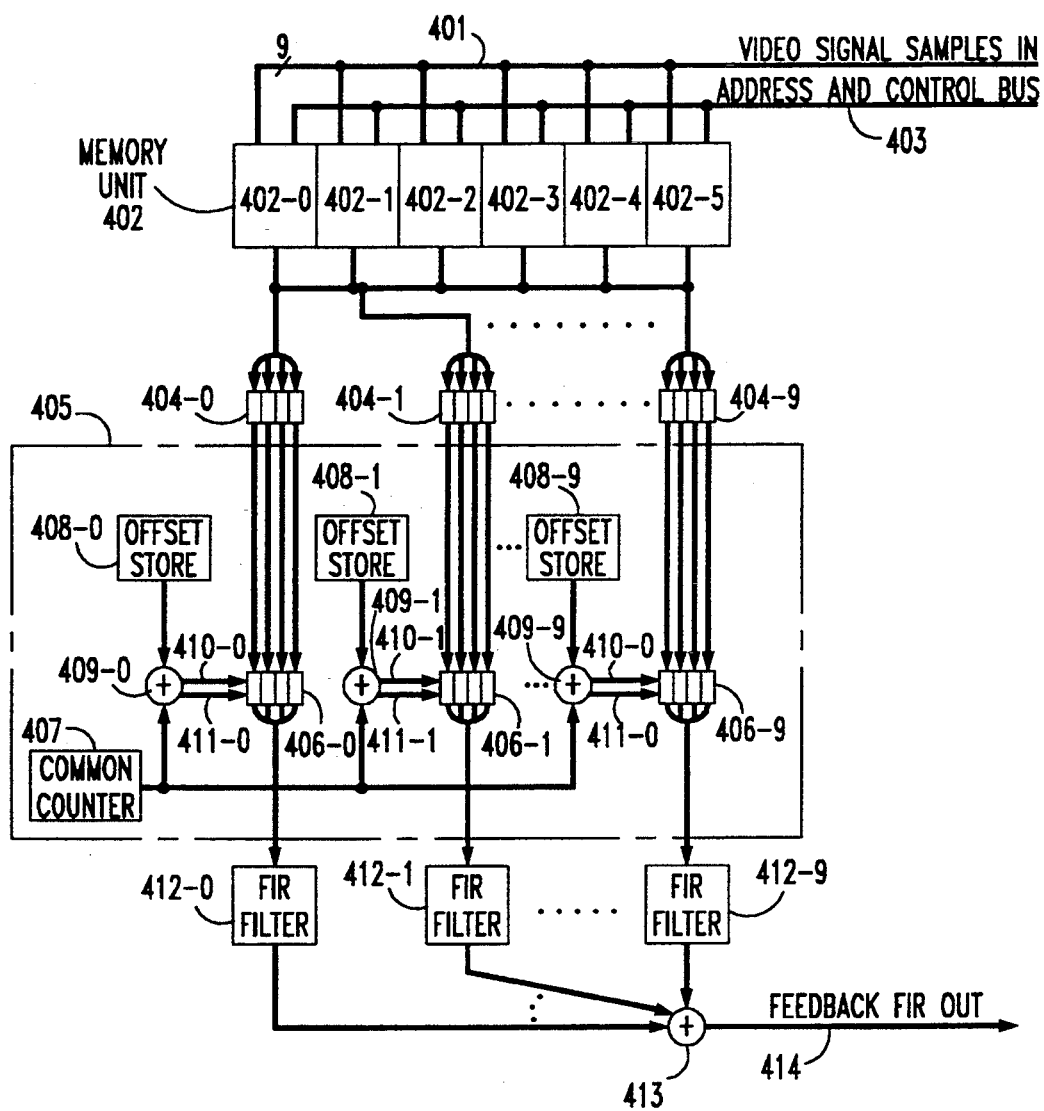
FIG. 4 is a block-schematic diagram of a first embodiment of the present invention for providing the feedback FIR filter shown in FIG. 1.

FIG. 4 shows an illustrative embodiment of the present invention for realizing feedback FIR filter 103 of FIG. 1 in a manner which compensates for widely separated ghosts in a television channel. In this embodiment, incoming 9-bit video signal samples are supplied on bus 401 to memory 402 and written in consecutive locations therein under the control of write signals on bus 403. To conserve power, memory 402 is advantageously a random access memory (RAM) having six sections designated as 402-0 through 402-5. Each section has the capacity to store 128 9-bit samples, and the total capacity of memory 402 is at least equal to the expected time span between a received video signal and the last postcursor ghost associated with that received video signal. In the illustrative embodiment of FIG. 4, the total capacity of memory 402 is 768 signal samples.

The incoming signal sample rate is 14.32 MHz. To reduce the required clock speed, a plurality of signal samples is read out of memory 402 into one of second memory units 404-0 through 404-9 on each read signal coupled on bus 403. More specifically, for this application, four contiguous signal samples from memory 402 are written into one of second memory units 404-0 and 404-9 on each read signal on bus 403. In effect, then, each section of memory 402 from the standpoint of the read operation is viewed as storing thirty-two 36-bit "quadruple samples". The write and read signals are arranged on bus 403 so each write signal is followed by three read signals in each incoming signal sample period, i.e., 1/14.32 MHz Therefore, between five consecutive write signals there are twelve read signals. Ten of these twelve read signals are used to control the reading out of signal samples from memory 402 into a different one of memory units 404-0 through 404-9. The remaining two out of the twelve read signals are not used. It should be noted that the ten read operations are fully independent. Each read operation accesses a different set of four consecutively stored samples from any of the sections of memory 402 and couples these samples to any one of memory units 404-0 through 404-9. The above-described structure has many advantages. For example, this structure can advantageously be arranged via software to direct any set of four consecutively stored samples to any FIR filter. As a result, multiple FIR filters can be supplied with the appropriate samples so as to function as a single concatenated FIR filter. In addition, since the FIR filters need not have the same number of tap-weight coefficients, one or more such filters could have more tap-weight coefficients and be supplied with those samples necessary for cancelling more severe ghosts.

While a plurality of signal samples is read out of memory 402, it should be appreciated that due to the structure of a RAM, only certain sets of four samples can be read out. That is, to retrieve multiple samples with each read, memory 402 is viewed as storing 192 36-bit quadruple samples and each of these 192 quadruple samples can be retrieved and fed to memory units 404-0 through 404-9. With such multiple retrieval, each of memory units 404-0 through 404-9 must be replenished with new samples at a submultiple of the incoming video sample rate if each such memory unit is to provide samples to its associated FIR filter at the incoming video rate. In the disclosed embodiment, the incoming video sample rate is 14.32 MHz and the submultiple of the incoming video sample rate is $$\frac{14.32 \text{ MHz}}{4}.$$

However, due to the location of the ghosts in the time domain in a particular application, it may be necessary that the second, third or fourth one of the retrieved quadruple samples coupled to one of the memory units 404-0 through 404-9 is processed by its associated FIR filter at the same time that the first of the four samples in another one of such memory units is processed by its associated FIR filter. To provide this capability, the present invention advantageously utilizes a "fine-addressing" scheme in connection with each of the memory units 404-0 through 404-9.

As mentioned, the resolution of ghost locations using the addressing of the memory 402 is limited to an increment of n, where n is four in the illustrative embodiments. Therefore, alignment of ghost locations within memory 402 is limited to L/n positions, where L is the span of memory 402, i.e., 768 signal samples. To provide cancellation of ghosts with a finer resolution, the embodiment of FIG. 4 utilizes fine addressing apparatus 405. Apparatus 405 includes a plurality of memories 406-0 through 406-9 wherein each such memory is associated with a different one of memories 404-0 through 404-9 and is the same size as its associated memory. Apparatus 405 also includes a common counter 407, offset stores 408-0 through 408-9 and modulo n adders 409-0 through 409-9 wherein the offset stores and adders are respectively associated with memories 406-0 through 406-9. It should be appreciated that the determination of the offset counts provided by offset stores 408-0 through 408-9 are determined using well-known techniques and are a function of the ghost spacing.

Common modulo n counter 407 counts by ones from 0 to n-1 and then resets or "wraps" around to 0. The counter output is supplied as an input to each modulo n adder. The other input to each adder is provided by a different associated one of offset stores 408-0 through 408-9. Each modulo n adder sums the current count of common counter 407 with the offset count provided by the associated offset store and resets or overflows upon reaching the sum n. Upon overflow, adders 409-0 through 409-9 respectively generate a signal on leads 410-0 through 410-9. The overflow signal provided by each adder serves as a signal to respectively write the samples from a different one of memories 404-0 through 404-9 to the associated one of memories 406-0 through 406-9. The sum provided by each modulo n adder on leads 411-0 through 411-9 is coupled to the associated one of memories 406-0 through 406-9 and serves as a read pointer for that memory. Accordingly, by storing the appropriate offset value for each of memories 406-0 through 406-9, any of the four samples in one of these memories can be simultaneously read out with any of the four samples stored in a different one of these memories.

Each of FIR filters 412-0 through 412-9 is associated with a different one of memories 410-0 through 410-9. Each sample read out of the memories 410-0 through 410-9 is coupled to its associated FIR filter. Each FIR filter includes a tapped delay line into which the received signal samples are successively stored and forwarded therethrough. The received signal sample stored in each separate storage location or "tap" is respectively multiplied by an associated tap-weight coefficient and the products thus formed are summed. The tap-weight coefficients each have a value which is a function of the ghost characteristics and which may be determined using well-known techniques. Summer 413 combines the outputs from each of the FIR filters 412-0 through 412-9 to provide the feedback FIR filter output on lead 414.

Figure 5:
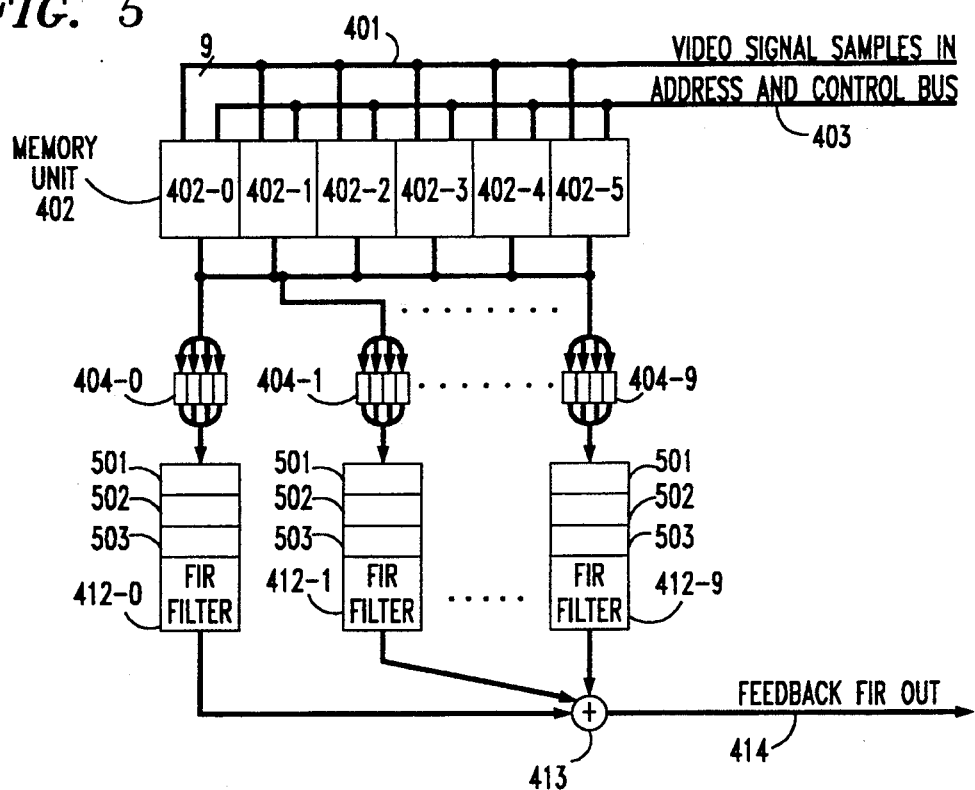
FIG. 5 is a block-schematic diagram of a second embodiment of the present invention for providing the feedback FIR filter shown in FIG. 1.
Figure 6:
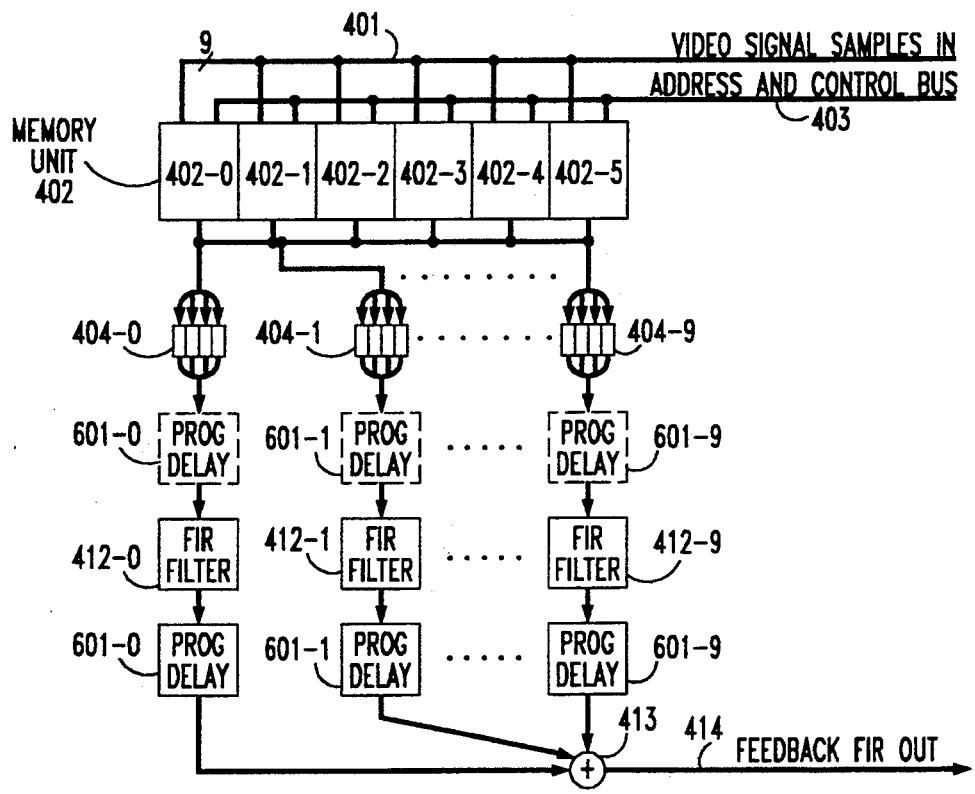
FIG. 6 is a block-schematic diagram of third and fourth embodiments of the present invention for providing the feedback FIR filter shown in FIG. 1.

Alternative structures which provide the fine addressing capability of apparatus 405 are also possible. Such alternative structures are shown in FIGS. 5 and 6. In FIG. 5, the operation of memories 402 and 404-0 through 404-9 are identical to that described with respect to FIG. 4. To provide fine addressing capability, a number of FIR elements are added to each of FIR filters 412-0 through 412-9. In general, the number of such FIR elements added to each FIR filter is equal to n-1. In the disclosed embodiments, n=4 and the additional FIR elements are designated in FIG. 5 as 501,502 and 503. Each of these additional FIR elements as with each of FIR elements of the tapped delay line following element 503 provides a data delay of the reciprocal of the incoming video sample rate and has an associated tap-weight coefficient. We may view these tap-weight coefficients of the expanded tapped delay line, i.e., including elements 501–503, as forming an ordered sequence with the tap-weight coefficient associated with FIR element 501 as the first coefficient in such sequence. Now, depending on the offset count required in FIG. 4 based on ghost spacing, certain of the tap-weight coefficients in the ordered sequence will be zero. For example, to provide the equivalent effect of a stored offset count of 3 in FIG. 4, the first tap-weight coefficient associated with FIR element 501 will be non-zero as will be that associated FIR element 502, etc., until the last three tap-weight coefficients in the ordered sequence which will be zero. Similarly, to provide the equivalent effect of a stored offset count of 2, 1 and 0 in FIG. 4, then the first non-zero tap-weight coefficient is respectively associated with FIR elements 502, 503 and the first FIR element in the tapped delay line following element 503.

FIG. 6 shows third and fourth possible arrangements for providing the fine addressing capability of FIG. 4. In FIG. 6, the operation of memories 402, 404-0 through 404-9 and FIR filters 412-0 through 412-9 operate as in HG. 4. To provide the n-1 desired offset, a programmable delay element 601-0 through 601-9 is respectively disposed between FIR filters 412-0 through 412-9 and summer 413. Each programmable element can provide a delay of between zero and n-1 signal sample periods wherein the amount of such delay is equal to the n-1 minus the desired offset. Alternatively, the position of programmable delay elements 601-0 through 601-9 could also be respectively disposed before FIR filters 412-0 through 412-9. These alternative positions of the delay elements are shown by dotted lines in FIG. 6.

It should, of course, be understood that while the present invention has been described in reference to the disclosed embodiments, other arrangements may be apparent to those of ordinary skill in the art without departing from the spirit and scope of the present invention. For example, while in the disclosed embodiments, memory 402 is a single port RAM which utilizes shared access of read and write signals via bus 403, a dual-port RAM could be used so that the read and write signals could be independent of one another and, as a result, the number of FIR filters could be increased from the maximum of 12 in the disclosed embodiments. Furthermore, while in the disclosed embodiments, the writing of signal samples into memory 402 is done at the incoming signal sample rate, an additional buffer could be disposed in front of memory 402 so that the writing operation for memory 402 could be done at a submultiple of the incoming signal sample rate. This would also allow an increase in the number of HR filters. Moreover, while in the disclosed embodiments, each of the FIR filters has been described as incorporating a tapped delay line, multipliers and a summer, the function of such filters can be provided by one or more appropriately programmed general-purpose processors, or special-purpose integrated circuits, or digital signal processors, or an analog or hybrid counterpart of any of these devices. Finally, while the disclosed application of the present invention has been described in reference to the cancellation of ghosts in television transmission applications, the present invention is not limited to such applications and, indeed, may be utilized for the cancellation of signal dispersion in a wide variety of communications systems.

We claim:

1. Apparatus for eliminating signal dispersion in incoming signal samples having a sample rate, said apparatus comprising;
    first means for storing said incoming signal samples at said sample rate;
    at least one second means for storing signals, each second storing means being connected to said first storing means;
    at least one filter means for removing signal dispersion; and
    means for providing signal samples from said first storing means to each of said second storing means at a submultiple of said sample rate and for then providing said signal samples in said second storing means to said filter means at said sample rate.

2. The apparatus of claim 1 including a plurality of said second storing means and a plurality of said filter means, each filter means receiving stored samples from a different one of said second storing means.

3. The apparatus of claim 1 wherein said first means for storing is a random access memory.

4. The apparatus of claim 1 wherein each filter means is a finite impulse response filter.

5. The apparatus of claim 1 further including means for outputting any sample from one of said second storing means at the same time as any other sample from another second storing means.

6. The apparatus of claim 5 wherein said outputting means includes means for addressing each second storing means with an address, each address being a combination of a first number common to all of said second storing means and a second number which varies from one second storing means to another.

7. The apparatus of claim 6 wherein said outputting means includes a common counter for providing said first number and at least one number storing device for providing said second number, each number storing device being associated with a different one of said second storing means.

8. The apparatus of claim 5 wherein said outputting means further includes at least one third signal storing means, each third storing means being connected between a different one of said second storing means and a different one of said filter means.

9. The apparatus of claim 5 wherein said outputting means includes at least one programmable delay element being connected between each second signal storing means at its associated filter means.

10. The apparatus of claim 5 wherein said outputting means includes at least one programmable delay element coupled to the output of each filter means.

11. The apparatus of claim 5 wherein each filter means includes a tapped delay line having a plurality of fixed delay elements and said outputting means includes a plurality of additional fixed delay elements added to each tapped delay line.

12. The apparatus of claim 1 wherein said first storing means includes means for writing said incoming signal samples into said first storing means at said sample rate.

13. The apparatus of claim 2 further including means for combining the output of said filter means.

14. The apparatus of claim 1 further including means for outputting filtered signal samples from said filter means at said sample rate.

15. The apparatus of claim 1 wherein said providing means provides samples from any location in said first storing means to any second storing means.

16. A method of eliminating signal dispersion in incoming signal samples having an incoming sample rate, said method comprising the steps of;
   storing said incoming signal samples in a first storing device at said incoming sample rate;
   providing the stored signal samples in said first storing device to at least one second storing device at a submultiple of said incoming sample rate; and
   providing the stored signal samples in each second storing device to an associated filter at said incoming sample rate.

17. Apparatus for eliminating signal dispersion in incoming signal samples having a sample rate, said apparatus comprising;
   first means for storing said incoming signal samples at said sample rate;
   a plurality of second means for storing signals, each second storing means being connected to said first storing means;
   a plurality of filter means for removing signal dispersion, each of said filter means having an output;
   means for providing signal samples from said first storing means to each of said second storing means at a submultiple of said sample rate and for providing said signal samples in each second storing means to a different filter means in said plurality of filter means at said sample rate; and
   means for combining the output of each of said plurality of filter means.

18. A method of eliminating signal dispersion in incoming signal samples having an incoming sample rate, said method comprising the steps of;
   storing said incoming signal samples in a first storing device at said incoming sample rate;
   providing the stored signal samples in said first storing device to a plurality of second storing devices at a submultiple of said incoming sample rate;
   providing the stored signal samples in each second storing device to a different filter at said incoming sample rate, each filter having an output; and
   combining all the filter outputs.

* * * * *